United States Patent
Hiroyuki et al.

(10) Patent No.: US 7,480,115 B2
(45) Date of Patent: Jan. 20, 2009

(54) MAGNETIC DISK DRIVE WITH HEATER TO CONTROL FLYING HEIGHT AND MANUFACTURING METHOD THEREOF

(75) Inventors: Ono Hiroyuki, Kanagawa (JP); Mike Suk, San Jose, CA (US); Hideaki Tanaka, Kanagawa (JP); Masayuki Kurita, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/494,683

(22) Filed: Jul. 26, 2006

(65) Prior Publication Data
US 2007/0030593 A1    Feb. 8, 2007

(30) Foreign Application Priority Data
Aug. 4, 2005    (JP)    ............................ 2005-227298

(51) Int. Cl.
G11B 21/02    (2006.01)
(52) U.S. Cl. ...................................... 360/75
(58) Field of Classification Search ........................ None
See application file for complete search history.

(56) References Cited

U.S. PATENT DOCUMENTS

| 6,631,049 B2 | 10/2003 | Satoh et al. | |
| 6,950,267 B1 * | 9/2005 | Liu et al. | 360/75 |
| 6,972,919 B2 * | 12/2005 | Suk | 360/75 |
| 7,088,545 B1 * | 8/2006 | Singh et al. | 360/75 |
| 7,180,692 B1 * | 2/2007 | Che et al. | 360/31 |

FOREIGN PATENT DOCUMENTS

JP    2004-079126    3/2004

* cited by examiner

*Primary Examiner*—K. Wong
(74) *Attorney, Agent, or Firm*—Townsend and Townsend and Crew LLP; Darren Gold (57) ABSTRACT

Embodiment of the invention improve the productivity of a magnetic disk drive that controls the flying height of a magnetic head by use of a heater. According to an embodiment, in a method for manufacturing a magnetic disk drive that writes/reads information to/from a magnetic disk medium by use of a magnetic head including a heater adapted to control the flying height, the read and write performance of the magnetic head is tested; a heating condition used at the time of heating by the heater is determined on the basis of the test results; and a control parameter that specifies the amount of heating by the heater in the determined heating condition is determined.

16 Claims, 4 Drawing Sheets

| Head number 0 | | | | | | |
|---|---|---|---|---|---|---|
| Temperature zone | Access mode | Zone 0 | Zone 1 | ... | | |
| B1 | Write | l1w0 | l1w1 | ... | | |
| | Read | l1r0 | l1r1 | ... | | |
| B2 | Write | l2w0 | l2w1 | ... | | |
| | Read | l2r0 | l2r1 | ... | | |
| ... | ... | ... | ... | ... | | |

MAGNETIC DISK DRIVE WITH HEATER TO CONTROL FLYING HEIGHT AND MANUFACTURING METHOD THEREOF

CROSS-REFERENCES TO RELATED APPLICATIONS

This application claims priority from Japanese Patent Application No. JP2005-227298, filed Aug. 4, 2005, the entire disclosure of which is incorporated herein by reference.

BACKGROUND OF THE INVENTION

The present invention relates to a method for manufacturing a magnetic disk drive in which a magnetic head is heated by a heater to control the flying height from a magnetic disk medium to the magnetic head so that write performance and read performance are improved.

In recent years, magnetic disk drives such as hard disks have achieved widespread use not only for computer equipment but also for home electric appliances such as hard disk recorders. Each of such magnetic disk drives comprises a magnetic disk medium and a magnetic head. The magnetic head magnetizes the magnetic disk medium while flying above it, and also reads a magnetized state of the magnetic disk medium, thus writing and reading information thereto and therefrom. Here, for example, when information is written, with the decrease in clearance between the magnetic disk medium and the magnetic head, the expansion of a magnetic field formed by the magnetic head can be further decreased. As a result, the area magnetized on the magnetic disk medium becomes smaller. In other words, in order to increase the recording density of the magnetic disk drive, it is necessary to decrease the clearance between the magnetic disk medium and the magnetic head, i.e., the flying height of the magnetic head.

Conventional approaches for decreasing the flying height of the magnetic head include a technology in which a heater formed of a thin film resistor is placed in proximity to a magnetic head device so as to heat a magnetic head to cause thermal expansion, thereby allowing the magnetic head to get closer to a magnetic disk medium. In this case, the flying height of the magnetic head changes in response to a situation in which a magnetic disk is used (e.g., the use environmental temperature, a zone of the magnetic disk medium that is a target to be written/read, and operation modes such as write and read). Therefore, it is necessary to control the amount of heating by the heater in response to the use situation.

As a specific example, there is disclosed a magnetic disk drive capable of controlling the amount of heating by a heater. In this magnetic disk drive, a control table for associating a use situation with control parameters such as the amount of heating by the heater is stored beforehand. When the magnetic disk drive is used, the control table is referred to so that the amount of heating by the heater is determined in response to the use situation. See, e.g., Japanese Patent Laid-open No. 2004-79126 (patent document 1).

BRIEF SUMMARY OF THE INVENTION

The determination of the control parameters as disclosed in the patent document 1 requires the operation of: while changing a condition of an operating environment, measuring a read-and-write error rate, and the like, with a control parameter being changed in each operating environment; and storing, as a proper value, the control parameter obtained when it is judged that the read-and-write error rate, and the like, are within an allowable range. In addition, a condition range of the operating environment in which the control parameters should be determined needs to cover the whole operation guarantee range of the magnetic disk drive.

However, if the method in which the read-and-write error rate and the like are measured over the whole operation guarantee range is used to determine the control parameters, it takes a long time to determine the control parameters. Accordingly, it is not possible to improve the productivity.

On the other hand, the fact is that the performance of the magnetic head differs depending not only on the use situation but also on each head. Accordingly, there is a case where within a condition range of a specific operating environment, the performance of some magnetic heads does not require heating by the heater. If the performance of the magnetic head is so good that heating is not required, it is desirable to keep the flying height as high as possible so as to reduce the possibility that the magnetic head will touch a disk.

The present invention has been made taking the above-mentioned situations into consideration. A feature of the present invention is to control the flying height of a magnetic head with a high degree of accuracy by minutely specifying the required minimum amount of heating by a heater in a manufacturing stage in response to conditions of each head and those of each zone. Another feature of the present invention is to improve the productivity of a magnetic disk drive by, in spite of the above control with high accuracy, minimizing the time required to determine control parameters.

One aspect of the present invention is directed to a manufacturing method for manufacturing a magnetic disk drive that writes/reads information to/from a magnetic disk medium by use of a magnetic head including a heater for controlling the flying height. This method includes the steps of: testing the read and write performance of the magnetic head; on the basis of the result of the test, determining a heating condition used at the time of heating by the heater; and determining a control parameter that specifies the amount of heating by the heater in the determined heating condition.

DETAILED DESCRIPTION OF THE INVENTION

Figure 1:
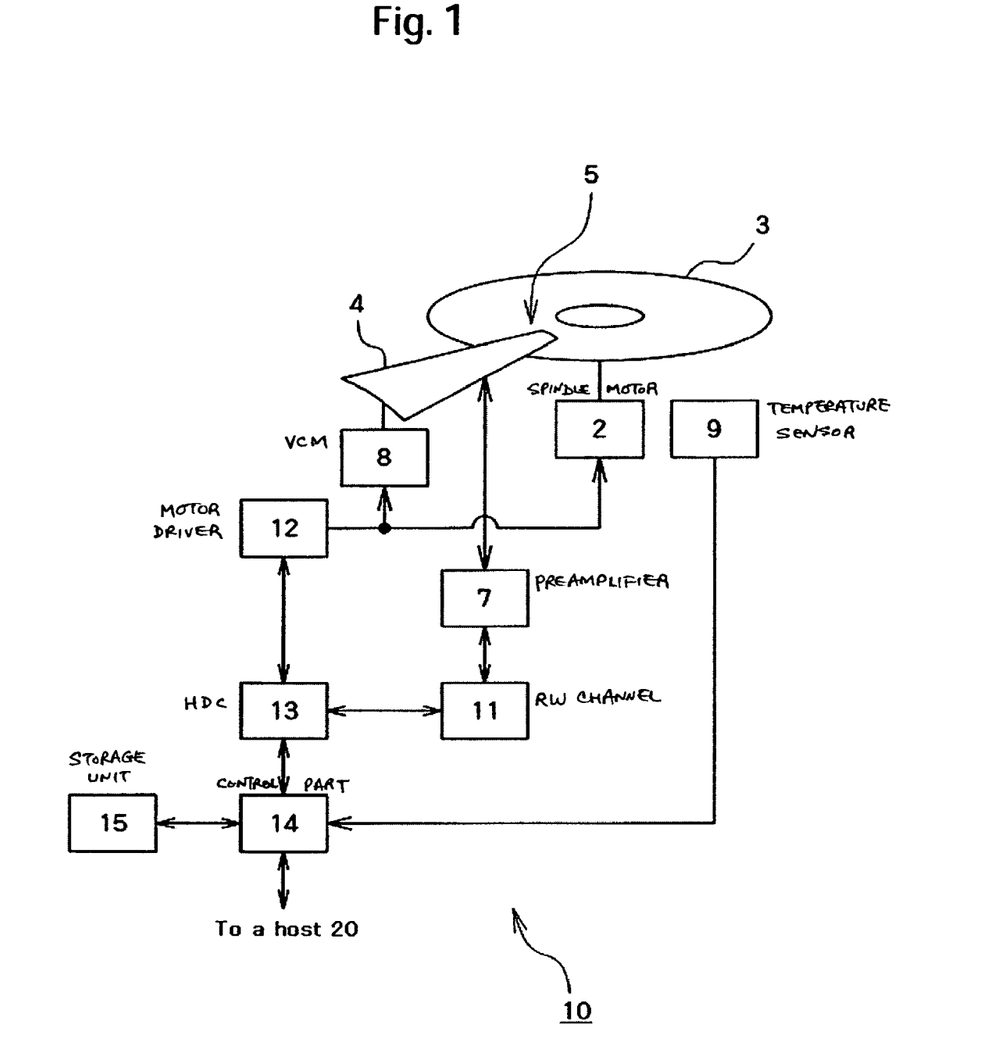
FIG. 1 is a configuration block diagram illustrating an example of a magnetic disk drive that is manufactured by a manufacturing method according to an embodiment of the present invention.

One embodiment of the present invention will be described with reference to the drawings below. FIG. 1 is a block diagram illustrating as a whole a magnetic disk drive manufactured by a manufacturing method that is taken as an example according to one embodiment of the present invention. A magnetic disk drive 10 manufactured by the manufacturing method according to this embodiment comprises a spindle motor 2, a magnetic disk medium 3, a carriage assembly 4, a magnetic head 5, a preamplifier 7, a voice coil motor (VCM) 8, a temperature sensor 9, a read/write channel 11, a motor driver 12, a hard disk controller (HDC) 13, a control part 14, and a storage unit 15.

Figure 2:
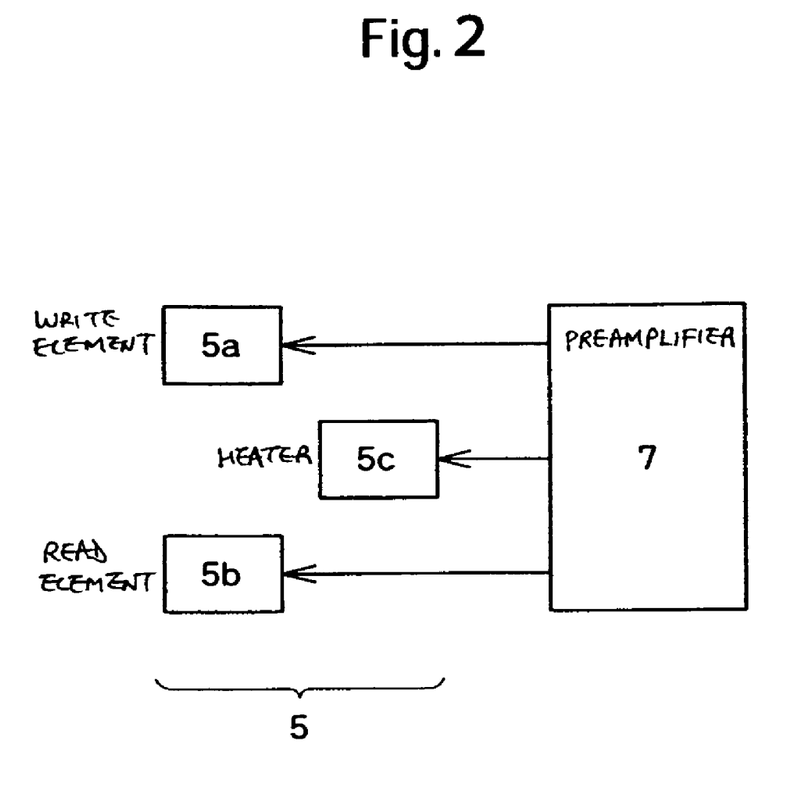
FIG. 2 is a configuration block diagram illustrating a specific example of a magnetic head of a magnetic disk drive that is manufactured by a manufacturing method according to an embodiment of the present invention.

The spindle motor 2 drivingly rotates the magnetic disk medium 3. The carriage assembly 4 is drivingly rotated by the voice coil motor 8, which causes the magnetic head 5 attached to the tip of the carriage assembly 4 to move relative to the magnetic disk medium 3 nearly in the radial direction of the magnetic disk medium 3. As shown in FIG. 2, this magnetic head 5 flies above the magnetic disk medium 3. The magnetic head 5 comprises: a write element 5a for magnetically writing data to the magnetic disk medium 3; and a read element 5b for reading out written data. Moreover, this magnetic head 5 is provided with a heater 5c.

Upon receiving a signal representing information to be written, the preamplifier 7 amplifies the signal and outputs the amplified signal to the write element 5a of the magnetic head 5. In addition, the preamplifier 7 also amplifies a read signal that is output from the read element 5b. Then, the preamplifier 7 outputs the amplified read signal. Further, when the preamplifier 7 according to this embodiment receives as an input an instruction of the amount of electric current to be output to the heater 5c, the preamplifier 7 supplies the instructed amount of electric current (voltage, electric power, or the like) to the heater 5c.

The temperature sensor 9 detects the environmental temperature in an area in proximity to the magnetic head 5, and then outputs a signal representing the detected temperature. This temperature sensor 9 may also be located on, for example, the carriage assembly 4. In another case, as is the case with the HDC 13, the control part 14, and the like, the temperature sensor 9 may also be located on a substrate (card).

The read/write channel 11 outputs, to the preamplifier 7, a signal into which data as a target to be written is code modulated. In addition, this read/write channel 11 code-demodulates the read signal, which is output from the preamplifier 7, and then outputs, to the HDC 13, data acquired as a result of the code demodulation.

According to an instruction inputted from the control part 14, the motor driver 12 outputs a driving current to the spindle motor 2 and the voice coil motor 8 so as to operate the spindle motors 2 and the voice coil motor 8.

The HDC 13 receives a command and data to be written, which have been transmitted from an outside host 20. The HDC 13 also transmits, to the host 20, read data that has been output by the read/write channel 11.

In order to perform position control of the magnetic head 5, the control part 14 controls each part such as, for example, the motor driver 12. This control part 14 is a program control device such as a microcomputer, and operates according to a built-in program and/or a program stored in the storage unit 15. In this embodiment, this control part 14 informs the preamplifier 7 of the amount of electric current to be supplied to the heater 5c. Operation of this control part 14, and the like, will be described later.

The storage unit 15 stores a program that is executed by the control part 14, and data required for the execution of the program. In addition, this storage unit 15 stores values (control parameters) that are referred to by the control part 14 when the control part 14 controls the heater 5c. An example of the control parameters will also be described later. Incidentally, this storage unit 15 includes, for example, nonvolatile memories such as an EEPROM (electrically erasable ROM). Moreover, this storage unit 15 may also partially include an area on the magnetic disk medium 3. In such a case, at the time of manufacturing the magnetic disk drive 10, the control parameters are stored on the magnetic disk medium 3. When the magnetic disk drive 10 is used, after the power is turned on, the control parameters are first copied from the magnetic disk medium 3 to a memory that can be accessed at high speed. Then, the control parameters are referred to when the heater 5c is controlled.

Manufacturing Method

Next, a manufacturing method of this magnetic disk drive 10 will be described. In this embodiment, after assembling of each part of the magnetic disk drive 10 is completed, and also after writing of a servo signal is completed, firstly, the read and write performance of the magnetic head 5 is tested; secondly, a heating condition of the heater is determined on the basis of the result of this test; and thirdly, a control parameter which specifies the amount of heating of the heater under the heating condition is determined.

Read and Write Performance Test

The read and write performance of the magnetic head 5 is tested in the following manner. First of all, the magnetic disk drive 10 is placed in a predetermined reference temperature environment. Next, production equipment is connected to the magnetic disk drive 10. Then, write data and a write command are output from this production equipment to the magnetic disk drive 10. Subsequently, a read command is output from this production equipment to the magnetic disk drive 10. Thus, data is written/read to/from the magnetic disk medium 3 by use of the magnetic head 5 so that the production equipment detects an error rate. It is to be noted that as the reference temperature, for example, normal temperature based on design specifications of the magnetic disk drive 10 may also be adopted.

Figure 3:
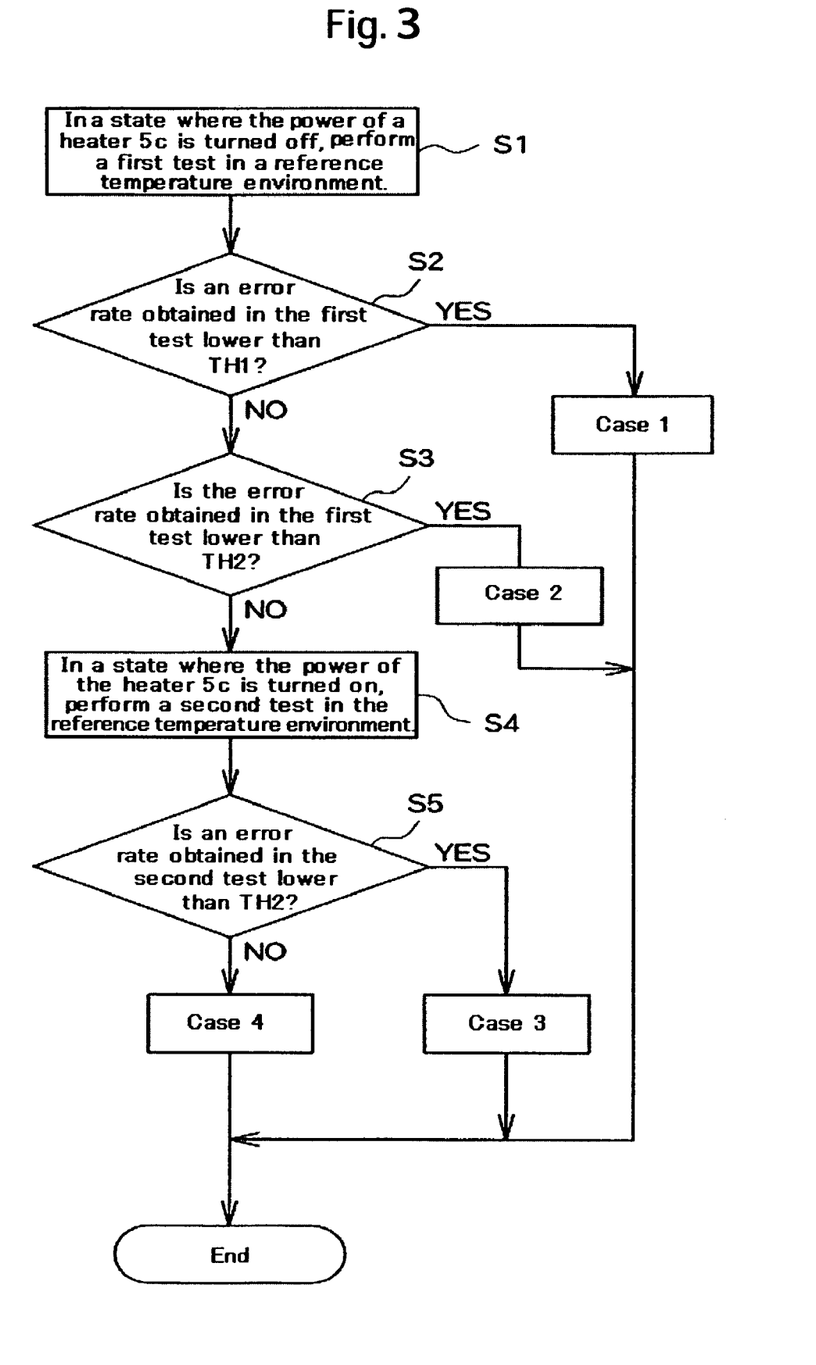
FIG. 3 is a flowchart partially illustrating as an example a manufacturing method for manufacturing a magnetic disk drive according to an embodiment of the present invention.

A specific example of a read and write test is as described below. As shown in FIG. 3, in a state in which the electric power is not supplied to the heater 5c (in other words, in a state in which the power of the heater 5c is turned off), the production equipment is used to perform a first test in which data is written and read in a reference temperature (normal temperature) environment for a track which is selected from the magnetic disk medium 3, and on which attention is focused ($S_1$). Next, a heating condition is determined by comparing an error rate obtained in the first test with a predetermined threshold value. For example, using two threshold values $TH_1$ and TH2 (TH11<TH2), the heating condition is determined (S2, S3) by judging whether or not an error rate in the first test is classified into one of the following cases:

1. A case where the error rate in the first test is sufficiently low (the error rate is lower than the first threshold value TH1) (case 1);

2. A case where the error rate in the first test is relatively low (the error rate is between the first threshold value TH1 and the second threshold value TH2) (case 2).

Here, if the error rate is classified into one of the above cases, the heating condition is judged to be a heating condition of case 1 or that of case 2, and then the processing ends. On the other hand, if the error rate is not classified into the above cases, in a state in which the specific electric power P2 to be applied at the time of the test is supplied to the heater 5c (to be more specific, in a state in which the magnetic head 5 is heated by the heater 5c by the predetermined amount of heating to be applied at the time of the test), a second test in which data is written and read in the reference temperature environment is further performed (S4).

A predetermined amount of electric power is applied to the heater 5c at the time of the test. In this case, it is desirable that the predetermined amount of electric power at the time of writing differ from that at the time of reading in the second test. For example, it is assumed that the amount of electric power Pw at the time of writing in the second test is 0, and that the amount of electric power Pr at the time of reading in the second test is Pr=PD=DFH/FP.

Here, DFH is the difference in flying height of the magnetic head 5 between the time of writing information and the time of reading information; and FP is variation in flying height of the magnetic head 5 per unit electric power. Both of DFH and FP are values determined by the sampling inspection performed at a manufacturing site of the magnetic disk drive 10. DFH and FP are predetermined as common values, for example, on a lot basis, and on a product basis. PD represents the electric power required to decrease the flying height at the time of reading to the same level as that at the time of writing.

Next, a heating condition is determined by comparing each of the error rates in the first and second tests with a predetermined threshold value. To be more specific, the heating condition is determined (S5) by classifying the error rates into one of the following cases:

3. A case where, although the error rate in the first test is relatively high (the error rate exceeds the second threshold value TH2), the error rate in the second test is relatively low (the error rate is lower than the second threshold value TH2) (case 3); and 4. A case where both of the error rates obtained in the first and second tests are relatively high (both of the error rates exceed the second threshold value TH2) (case 4).

Here, it is to be noted that a read-and-write error rate which should be guaranteed by the magnetic disk drive 10 at the normal temperature based on the design specification may also be used as the second threshold value TH2.

5. Incidentally, in case 4, a write/read test (third test) may also be performed at the maximum electric power that can be supplied to the heater 5$c$. In this case, if an error rate is not lower than the second threshold value TH2, manufacturing operation may also be interrupted, as a substandard article, without performing the processing described below. The specified maximum electric power which can be supplied to the heater 5$c$ is determined as below.

On the assumptions that normal temperature is TR, and that the upper limit of operation guarantee temperature is TH, $$Pw=PH=FT \times (TH-TR)/FP$$

$$Pr=PD+PH$$

Here, FP is variation in flying height of the magnetic head 5 per unit temperature change. FT is a value determined by the sampling inspection performed at the manufacturing site of the magnetic disk drive 10. FT is predetermined as a common value, for example, on a lot basis, and on a product basis.

Determination of Control Parameter

The steps S1 through S5 described above are executed for each head and for each zone. Thus, using the production equipment, a heating condition of the magnetic disk drive in question is judged on a head basis, and on a zone basis, to be any one of the cases 1 through 4. After that, a control parameter is determined.

Figure 4:
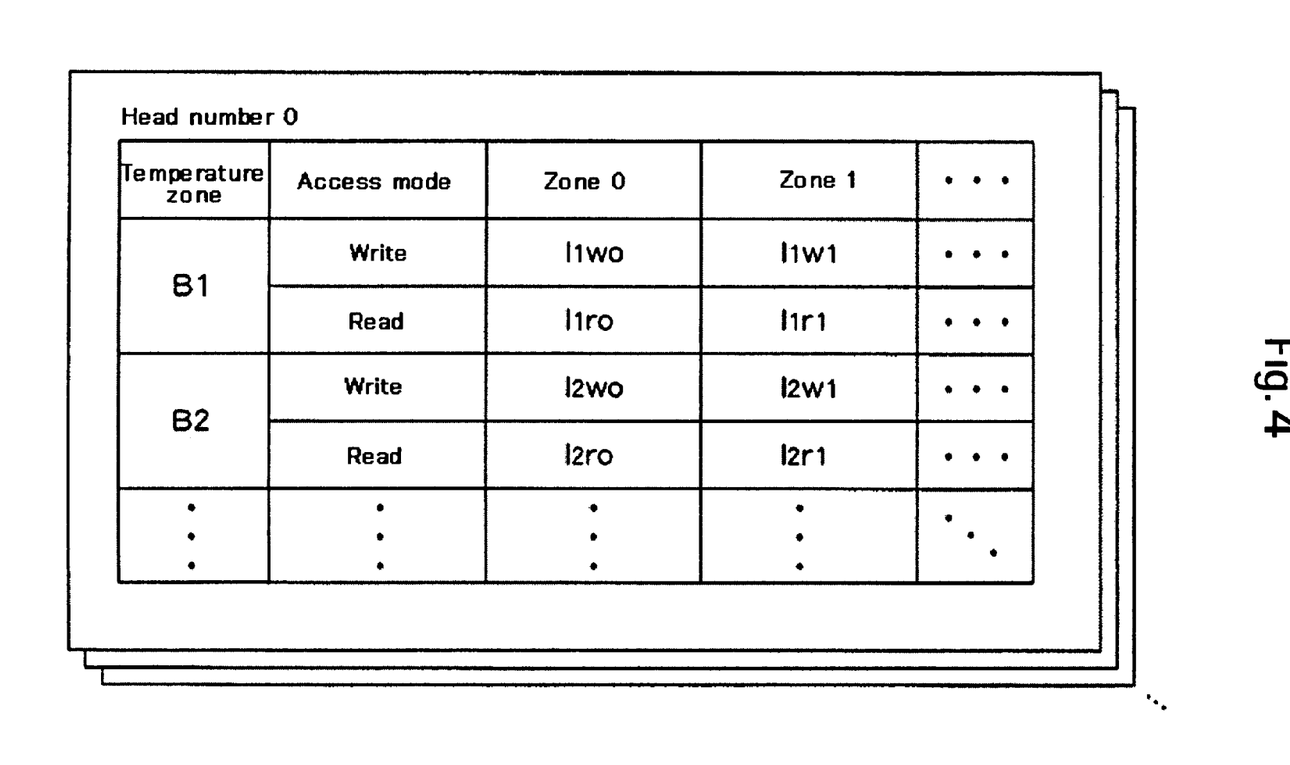
FIG. 4 is a diagram illustrating an example of control parameters that are set by a method for manufacturing a magnetic disk drive according to an embodiment of the present invention.

Here, the control parameter is a parameter specifying the amount of electric current, the amount of voltage, or the amount of electric power, which is supplied to the heater 5$c$. In this embodiment, the value of an electric current for heating the heater corresponds to the control parameter as follows: for example, if this parameter is "0", an electric current is 0 mA; if the parameter is "1", an electric current is 0.2 mA; and if the parameter is "10", an electric current is 2 mA. In this embodiment, the control parameter is determined for each head, for each zone, for each temperature zone, and for each access mode (write, read). The determined control parameters are stored in a nonvolatile memory of the storage unit 15, or in a specific area on the magnetic disk medium 3. To be more specific, the storage unit 15 has a table of control parameters as shown in FIG. 4. Incidentally, if an access mode is "read", not only the time during which data is read out, but also the time immediately before starting writing, may also be included.

Because the amount of flying-height control by the heater is roughly proportional to the electric power, the extent to which the heater is heated is first calculated by the electric-power. If the preamplifier 7 adopts electric-current control, the amount of electric current I is determined by $I=\sqrt{(P/RH)}$ where: P is the amount of electric power; and RH is the resistance of the heater 5$c$, which is measured by the sampling inspection of the magnetic disk drive 10 that is being manufactured. Then, a control parameter corresponding to the amount of electric current is stored. If the preamplifier 7 adopts voltage control, the amount of voltage is determined as a square root of a value that is obtained by multiplying the amount of electric power by a value of resistance of the heater 5$c$. Then, a control parameter corresponding to the amount of voltage is stored.

An example of control parameter settings will be specifically described as below.

For case 1 of the heating condition, it is thought that even if the heater 5$c$ is not used, sufficient read and write performance can be achieved up to the lower limit of operation compensation temperature. Therefore, a control parameter is set which makes the amount of electric power 0 in all temperature zones. In this case, "0" includes the minute amount of electric power that does not practically cause substantial thermal deformation ("0" described below is also the same).

For case 2 of the heating condition, it is thought that in the reference temperature environment (hereinafter referred to as "normal temperature"), and at the upper limit of the operation compensation temperature (hereinafter referred to as "high temperature"), even if the heater is not used, sufficient read and write performance can be achieved. Therefore, the amount of electric power at the normal temperature and at the high temperature is set at 0. However, at the lower limit of the operation compensation temperature (hereinafter referred to as "low temperature"), the flying height increases, and accordingly it can be estimated that sufficient read and write performance cannot be achieved. For this reason, for example, the electric power PL whose amount is corrected so that the flying height at the low temperature becomes roughly equivalent to the flying height at the normal temperature is set as the amount of electric power at the low temperature.

On the assumptions that the normal temperature is TR and the lower limit of operation guarantee temperature is TL, PL is calculated by the following equation:

$$PL=FT \times (TR-TL)/FP.$$

For case 2, the same PL value may also be set both for writing at the low temperature and for reading at the low temperature.

For case 3 of the heating condition, it is thought that if the heater is not used at the time of reading, the read and write performance satisfying the threshold value TH2 cannot be achieved even at the normal temperature. Therefore, the electric power that is larger than that in case 2 is required. The amount of electric power is set, for example, as follows: for writing at the low temperature, the amount of electric power is set at PL; for reading at the low temperature, the amount of electric power is set at PL+PD; for writing at the normal temperature, the amount of electric power is set at 0; for reading at the normal temperature, the amount of electric power is set at PD; for writing at the high temperature, the amount of electric power is set at 0; and for reading at the high temperature, the amount of electric power is set at PD.

For case 4 of the heating condition, it is thought that not only at the time of reading at the normal temperature, but also at the time of writing at the normal temperature, if the heater is not used, the read and write performance satisfying the threshold value TH2 cannot be achieved. Therefore, the electric power that is larger than that in case 3 is required. The amount of electric power is set, for example, as follows: for writing at the low temperature, the amount of electric power is set at PL+PH; for reading at the low temperature, the amount of electric power is set at PL+PD+PH; for writing at the normal temperature, the amount of electric power is set at PH; for reading at the normal temperature, the amount of electric power is set at PD+PH; for writing at the high temperature, the amount of electric power is set at 0; and for reading at the high temperature, the amount of electric power is set at PD.

Here, a range between the upper limit and the lower limit of the operation compensation temperature may be divided into many temperature zones and all control parameters each corresponding to each of the temperature zones may be stored. In another case, only control parameters in some temperature zones (for example, three temperature zones: low tone, normal temperature, and high temperature), the number of which is limited, may be stored, and then parts which are not included in the temperature zones may be interpolated by a linear equation or a quadratic equation before control.

Thus, in this embodiment, at the time of manufacturing the magnetic disk drive 10 that controls the flying height of the magnetic head by use of the heater, the performance of the magnetic head 5 is measured at the normal temperature, and then current value settings of the heater are stored in response to the performance. This eliminates the need to actually measure a read-and-write error rate over the whole operation guarantee range, which makes it possible to increase productivity.

To be more specific, with the increase in operating environment temperature, the flying height of the magnetic head 5 decreases. This is the same as the case where the heater is turned on. Accordingly, the performance is further improved as the environmental temperature increases. One of the characteristics in this embodiment is that paying attention to this point, by measuring the performance at the normal temperature, the performance at a temperature higher than the normal temperature (and/or at a temperature lower than the normal temperature) is estimated, which eliminates the need to perform tests over the whole temperature range.

Operation Example of the Magnetic Disk Drive

Next, an operation example of the magnetic disk drive 10 which has been manufactured in this manner will be described. In the description below, it is assumed that in the storage unit 15 of the magnetic disk drive 10, a value (control parameters) used for controlling the amount of electric current of the heater at the time of writing and at the time of reading is set on a temperature zone basis.

First of all, the operation of a magnetic head, and the operation in a zone, whose heating condition is judged to be case 1 as a result of a test for determining a heating condition, will be described. In this case, control parameters are set so that the amount of electric current of the heater both at the time of writing and at the time of reading becomes "0" or practically equivalent to "0", which is the minute amount of electric current, in all temperature zones.

Upon receiving a command for writing data and data to be written from the host 20, the HDC 13 outputs, to the read/write channel 11, the data to be written, and also outputs, to the motor driver 12, an instruction to move the magnetic head 5 to a write position in response to the command. At this time, the control part 14 acquires information about environmental temperature on the basis of a signal output from the temperature sensor 9. Then, the control part 14 acquires a control parameter (control parameter at the time of writing) corresponding to the temperature zone of the environmental temperature indicated by this acquired information, the control parameter being stored in the storage unit 15. Here, because the control parameter is a value by which the amount of electric current to be supplied to the heater 5c is made "0", the control part 14 outputs to the preamplifier 7 an instruction to make the amount of electric current to be supplied to the heater 5c "0". Accordingly, the preamplifier 7 does not practically supply electric current to the heater 5c.

On the other hand, the read/write channel 11 outputs to the preamplifier 7 a signal into which data to be written is modulated. The preamplifier 7 then amplifies this signal, and outputs the amplified signal to the write element 5a of the magnetic head 5. As a result, the data to be written is written to the magnetic disk medium 3.

Likewise, as soon as a command for reading out data is received from the host 20, the HDC 13 outputs, to the read/write channel 11, a read instruction based on the read command, and also outputs, to the motor driver 12, an instruction to move the magnetic head 5 to a read position in response to the command. At this time, the control part 14 acquires information about environmental temperature on the basis of a signal output from the temperature sensor 9. Then, the control part 14 acquires a control parameter (control parameter at the time of reading) corresponding to the temperature zone of the environmental temperature indicated by this acquired information, the control parameter being stored in the storage unit 15. Here, because the control parameter is a value by which the amount of electric current to be supplied to the heater 5c is made "0", the control part 14 outputs to the preamplifier 7 an instruction to make the amount of electric current to be supplied to the heater 5c "0". Accordingly, the preamplifier 7 does not practically supply electric current to the heater 5c.

On the other hand, the preamplifier 7 amplifies a read signal output from the read element 5b of the magnetic head 5, before outputting the read signal to the read/write channel 11. After that, the read/write channel 11 demodulates the signal amplified by the preamplifier 7 to generate read data, and then outputs the read data to the HDC 13. The HDC 13 outputs this read data to the host 20.

Next, a description will be made of the operation of a magnetic head, and the operation in a zone, whose heating condition is judged to be case 2 as a result of a test for determining a heating condition. In this case, in a relatively low temperature zone, a control parameter is set so that the amount of electric current of the heater becomes a specified value other than "0" both at the time of writing and at the time of reading. In addition, in other temperature zones, a control parameter is set so that the amount of electric current of the heater becomes "0" both at the time of writing and at the time of reading.

Upon receiving a command for writing data and data to be written, from the host 20, the HDC 13 outputs, to the read/write channel 11, the data to be written, and also outputs, to the motor driver 12, an instruction to move the magnetic head 5 to a write position in response to the command. At this time, the control part 14 acquires information about environmental temperature on the basis of a signal output from the temperature sensor 9. Here, if the acquired environmental temperature belongs to the relatively low temperature zone, the control part 14 acquires a control parameter (control parameter at the time of writing) corresponding to the temperature zone of the environmental temperature indicated by this acquired information, the control parameter being stored in the storage unit 15. Here, because the control parameter is a value by which the amount of electric current to be supplied to the heater 5c is made a specified value (a specified value other than "0"), the control part 14 outputs to the preamplifier 7 an instruction to make the amount of electric current to be supplied to the heater 5c the specified value. Accordingly, the preamplifier 7 supplies to the heater 5c an electric current, the amount of which is the specified value. Consequently, the heater 5c heats the magnetic head 5.

On the other hand, the read/write channel 11 outputs to the preamplifier 7 a signal into which data to be written is modulated. The preamplifier 7 then amplifies this signal, and outputs the amplified signal to the write element 5a of the magnetic head 5. As a result, the data to be written is written to the magnetic disk medium 3.

Likewise, upon receiving a command used for reading out data from the host 20, the HDC 13 outputs, to the read/write channel 11, a read instruction based on the read command, and also outputs, to the motor driver 12, an instruction to move the magnetic head 5 to a read position in response to the command. At this time, the control part 14 acquires information about environmental temperature on the basis of a signal output from the temperature sensor 9. Here, if the acquired environmental temperature in question belongs to the relatively low temperature zone, the control part 14 acquires a control parameter (control parameter at the time of reading) corresponding to the temperature zone of the environmental temperature indicated by this acquired information, the control parameter being stored in the storage unit 15. Here, because the control parameter is a value by which the amount of electric current to be supplied to the heater 5c is made a specified value (a specified value other than "0"), the control part 14 outputs to the preamplifier 7 an instruction to make the amount of electric current to be supplied to the heater 5c the specified value. Accordingly, the preamplifier 7 supplies to the heater 5c an electric current, the amount of which is the specified value. Consequently, the heater 5c heats the magnetic head 5.

On the other hand, the preamplifier 7 amplifies a read signal output from the read element 5b of the magnetic head 5, before outputting the amplified read signal to the read/write channel 11. After that, the read/write channel 11 demodulates the signal amplified by the preamplifier 7 to generate read data, and then outputs the read data to the HDC 13. The HDC 13 outputs this read data to the host 20.

Incidentally, in the above description, at the time of manufacturing, a value indicating the amount of electric current for each temperature range as shown in FIG. 4 is set, and is then stored in the storage unit 15. However, the following method may also be adopted. That is, values such as PL, PH, and PD are beforehand stored in the storage unit 15 as control parameters. At the time of operation, the electric power that should be actually supplied to the heater 5c is calculated. Then, the control part 14 instructs the preamplifier 7 to supply an electric current, the amount of which corresponds to the calculated electric power. Examples of calculation methods include a method in which the electric power is linearly interpolated with respect to temperature and a method in which an electric current or a voltage is linearly interpolated with respect to temperature.

Modified Example 1 of How to Determine Control Parameters

In the description up to this point, the constant values of the control parameters are predetermined in accordance with the respective operating conditions. However, after determination of the operating conditions, a test may also be repeatedly performed so as to determine the control parameters in further detail. This makes it possible to adjust the flying height with higher accuracy.

For example, for the above-mentioned examples, the following is to be performed:

(1) This modified example is not applied to case 1.

(2) In case 2, for example, instead of using the constant value PL described above, the minimum electric power satisfying the threshold value TH1 is determined in a test at the normal temperature, and then a control parameter corresponding to the electric power is stored.

(3) In case 3, for example, instead of using the constant value PD described above, the minimum electric power satisfying the threshold value TH2 is determined in a test at the normal temperature, and then a control parameter corresponding to the electric power is stored. It is assumed that PL is constant.

(4) In case 4, for example, instead of using the constant value PH described above, the minimum electric power satisfying the threshold value TH2 is determined in a test at the normal temperature, and then a control parameter corresponding to the electric power is stored. It is assumed that PL and PD are constant.

An error rate at the time of writing data, and that at the time of reading data, are measured with the amount of electric power to be supplied to the heater 5c being changed according to a heating condition. Then, for each of the error rates, the amount of electric power by which the error rate becomes lower than the threshold value TH1 or TH2 at the time of a test is found out. Examples of a method for achieving the above include a sequential method and a split-half method.

In the sequential method, with the amount of electric power to be supplied to the heater 5c being successively increased by a specified width of $\Delta P$ from a specified initial value of the lower limit (minimum value), the amount of electric power by which the error rate becomes lower than the threshold value at the time of the test is found out. Here, the specified width $\Delta P$ is an integral multiple of the minimum interval of the current to be supplied to the heater, which can be set by the preamplifier 7.

On the other hand, in the split-half method, a value (first median value) is determined by dividing the sum of a specified initial value of the lower limit and a specified initial value of the upper limit by 2. When the electric power equivalent to the first median value is supplied to the heater 5c, if an error rate is lower than the first threshold value at the time of the test, a new median value (second median value) is determined by dividing the sum of the specified initial value of the lower limit and the first median value by 2, and subsequently the test is repeated in like manner. Further, when the electric power of the first median value is supplied to the heater 5c, if an error rate is not lower than the first threshold value at the time of the test, a new median value (second median value) is determined by dividing the sum of the specified initial value of the upper limit and the first median value by 2, and subsequently the test is repeated in like manner. A search range is split into halves, then on the basis of whether or not the error rate becomes lower than the first threshold value at the median value of the search range, a new search range is selected from the two halved search ranges, and a search is repeated in like manner thereafter.

However, the method for determining the amount of electric power in this embodiment is not limited to the sequential method and the split-half method. Other methods may also be adopted.

The reason why, instead of performing repeated tests from the beginning to determine the minimum electric power satisfying the threshold value, one proper heating condition is first selected from among the four heating conditions is that first narrowing a search range makes it possible to shorten the time required, and thereby to improve the efficiency of production of the magnetic disk drive 10.

Modified Example 2 of How to Determine Control Parameters

Moreover, in the description up to this point, all of the amount of variation FT in the flying height of the magnetic head 5 per unit temperature change, the amount of variation FP in the flying height of the magnetic head 5 per unit electric power, and the difference DFH in flying height of the magnetic head 5 between the time of writing information and the time of reading information, are values determined by sampling inspection whose sample quantity is sufficient, and which is performed at a manufacturing site of the magnetic disk drive 10. For example, it is assumed that FT, FP, and DFH are predetermined with variations being expected as common values on a lot basis and on a product basis. However, in actuality, these values may vary with each magnetic head of the magnetic disk drive 10, or with each magnetic head and each zone. Therefore, after the assembling of each part of the magnetic disk drive 10 is completed, these values may also be measured again for each magnetic head 5, or for each magnetic head and each zone. The resistance RH of the heater may also be measured on a magnetic head basis in like manner. In this case, the flying height control with higher accuracy becomes possible.

In this case, although FP, DFH, RH can be measured at the normal temperature, FT (the amount of variation in the flying height of the magnetic head 5 per unit temperature change) cannot be measured only by the test at the normal temperature. Accordingly, a control parameter to be supplied to the heater 5c is temporarily determined by the processing described above, and then a test at temperature higher than the reference temperature is performed to update a value that specifies the amount of electric current (high-temperature test). As a specific example, a manufacturer of the magnetic disk drive 10 makes target environmental temperature of the magnetic disk drive 10 higher than the normal temperature, before measuring the amplitude of a read signal. A value of FT specific to an individual head can be determined by comparing the read-signal amplitude measured under a high temperature condition with the read-signal amplitude at the normal temperature.

By use of FT, FP, DFH that have been determined for each head or for each head and each zone, the manufacturer of the magnetic disk drive 10 can calculate PL, PD, PH again so that the control parameters stored in the storage unit 15 are updated.

Additional Example of a Manufacturing Method According to the Present Invention

In the above-mentioned test performed at high temperatures, with the objective of checking a margin S that is set as the minimum gap in preparation for the case where the magnetic disk drive 10 is used in a place where the atmospheric pressure is low, write is performed with the heater electric power at the time of writing S/FP being applied, and read is performed with the heater electric power at the time of reading S/FP+PD. When a write error or a read error is detected, the margin will become insufficient. Therefore, the head and a disk are judged to be defective.

Control on a Zone Basis

In the embodiment described above, as shown in FIG. 4, the most accurate method in which the magnetic disk medium 3 is divided into many zones so as to store control parameters has been described. However, a method in which a common control parameter is set over the whole range of the magnetic disk medium 3 (more specifically, the number of zones is only one) may also be used. In another case, the magnetic disk medium 3 is divided into the small number of zones (for example, three zones: an outer circumferential part, a middle circumferential part, and an inner circumferential part) so as to store control parameters; and other parts which are not included in the three zones are interpolated by a linear equation or a quadratic equation. This method may also be used.

Other Objects to be Measured

In the embodiment described above, the target to be evaluated in, for example, the first and second tests is an error rate. Instead of the error rate, overwriting may also be used as this target to be evaluated. In another case, the amount of variation of spacing measured from the change in amplitude of a read signal may also be used as the target to be evaluated.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for manufacturing a magnetic disk drive that writes/reads information to/from a magnetic disk medium by use of a magnetic head, wherein the magnetic head includes a heater that is configured to control a flying height of the magnetic head, the method comprising:

testing a read and write performance of the magnetic head to obtain a read-and-write error rate;

based on a result of the testing, determining a heating condition relating a performance of the magnetic head with a state of heating by the heater, wherein determining the heating condition includes comparing the error rate with at least one threshold value; and based on the determined heating condition, determining at least one control parameter that specifies an amount of heating by the heater.

2. A method for manufacturing a magnetic disk drive according to claim 1, wherein the error rate is compared to a first and a second threshold value, wherein the first threshold value is smaller than the second threshold value.

3. A method for manufacturing a magnetic disk drive according to claim 1, wherein the control parameter is separately determined for a read operation and a write operation.

4. A method for manufacturing a magnetic disk drive according to claim 1, wherein when the error rate is larger than the threshold value, determining the heating condition further includes:

increasing the temperature of the heater;

repeating testing a read and write performance of the magnetic head to obtain a new error rate; and comparing the new error rate to the threshold value.

5. A method for manufacturing a magnetic disk drive according to claim 4, wherein when the new error rate is larger than the threshold value, determining the heating condition further includes:
increasing the temperature of the heater to a maximum value;
repeating testing a read and write performance of the magnetic head to obtain a third error rate; and
comparing the third error rate to the threshold value.

6. A method for manufacturing a magnetic disk drive according to claim 4, wherein when the new error rate is less than the first threshold value, the heating condition is such that:
a control parameter is PL when writing at a temperature lower than a reference temperature, wherein $PL=FT \times (TR-TL)/FP$, wherein FT is a value determined by a sampling inspection performed at the manufacturing site of the magnetic disk drive, TR is a reference temperature, and TL is a lower limit of operation temperature;
a control parameter is PL+PD when reading at a temperature lower than a reference temperature, wherein $PD=DFH/FP$, wherein DFH is a difference in flying height of the magnetic head between writing and reading and FP is a variation in flying height of the magnetic head per unit power applied to the heater;
a control parameter is 0 when writing at the reference temperature or above; and
a control parameter is PD when reading at the reference temperature or above.

7. A method for manufacturing a magnetic disk drive according to claim 4, wherein when the new error rate is greater than the first threshold value, the heating condition is such that:
a control parameter is PL+PH when writing at a temperature lower than a reference temperature, where $PL=FT \times (TR-TR)/FP$, where FT is a value determined by a sampling inspection performed at the manufacturing site of the magnetic disk drive, TR is a reference temperature, and TL is a lower limit of operation, and wherein $PH=FT \times (TH-TR)/FP$, where TH is an upper limit of operation temperature;
a control parameter is PL+PD+PH when reading at a temperature lower than a reference temperature, wherein $PD=DFH/FP$, wherein DFH is a difference in flying height of the magnetic head between writing and reading and FP is a variation in flying height of the magnetic head per unit power applied to the heater;
a control parameter is PH when writing at the reference temperature or above; and
a control parameter is PD+PH when reading at the reference temperature or above.

8. A method for manufacturing a magnetic disk drive according to claim 2, wherein when the error rate is less than the first threshold value, the heating condition is such that the determined control parameter specifies no heating by the heater; and wherein when the error rate is greater than the first threshold value but less than the second threshold value, the heating condition is such that the determined control parameter specifies heating by the heater when the magnetic disk drive operates at a temperature that is lower than a reference temperature.

9. A method for manufacturing a magnetic disk drive according to claim 1, wherein:
the magnetic disk medium is divided into a plurality of zones, and said heating condition of heating by the heater is determined for each zone of the magnetic disk medium.

10. A magnetic disk drive comprising:
a magnetic head;
a heater to control the flying height of said magnetic head;
a storage unit that stores the control parameters specifying the amount of heating by the heater, wherein the control parameters are determined according to the method of claim 9.

11. A magnetic disk drive according to claim 10, wherein:
said storage unit includes a nonvolatile memory that is built in the magnetic disk drive or includes an area on a disk medium of the magnetic disk drive.

12. A magnetic disk drive comprising:
a magnetic head;
a heater to the control flying height of said magnetic head;
a storage unit that stores the control parameters specifying the amount of heating by the heater, wherein the control parameters are determined according to the method of claim 1.

13. A magnetic disk drive according to claim 12, wherein:
said storage unit includes a nonvolatile memory that is built in the magnetic disk drive or includes an area on a disk medium of the magnetic disk drive.

14. A method for manufacturing a magnetic disk drive according to claim 1, wherein:
said heating condition includes a condition relating how to determine the control parameters in a plurality of operating environment temperature zones;
said testing of the read and write performance of the magnetic head is performed at a predetermined reference temperature; and
based on the result of the testing performed at the reference temperature, the control parameter in each temperature zone is determined.

15. A magnetic disk drive comprising:
a magnetic head;
a heater to control the flying height of said magnetic head;
a storage unit that stores the control parameters specifying the amount of heating by the heater, wherein the control parameters are determined according to the method of claim 14.

16. A magnetic disk drive according to claim 15, wherein:
said storage unit includes a nonvolatile memory that is built in the magnetic disk drive or includes an area on a disk medium of the magnetic disk drive.

* * * * *

UNITED STATES PATENT AND TRADEMARK OFFICE
CERTIFICATE OF CORRECTION

PATENT NO. : 7,480,115 B2  Page 1 of 1
APPLICATION NO. : 11/494683
DATED : January 20, 2009
INVENTOR(S) : Hiroyuki et al.

It is certified that error appears in the above-identified patent and that said Letters Patent is hereby corrected as shown below:

Column 4, Line 45, please delete "TH11<TH2" and insert --TH1<TH2--.

Signed and Sealed this

Thirtieth Day of June, 2009

JOHN DOLL
*Acting Director of the United States Patent and Trademark Office*